United States Patent
Snapp et al.

(10) Patent No.: US 9,288,651 B2
(45) Date of Patent: *Mar. 15, 2016

(54) SYSTEM AND METHOD FOR DYNAMICALLY COUPLING A SPECIAL NUMBER CALL WITH A FUNCTION-FOCUSED ANSWERING UNIT

(71) Applicant: West Corporation, Omaha, NE (US)

(72) Inventors: John Lawrence Snapp, Westminster, CO (US); George Heinrichs, Longmont, CO (US); Daniel Zacek, Boulder, CO (US); Donald D. Mondul, Seeley Lake, MT (US); Stephen Marc Meer, Longmont, CO (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,096

(22) Filed: Feb. 1, 2013

(65) Prior Publication Data

US 2013/0203392 A1    Aug. 8, 2013

Related U.S. Application Data

(60) Provisional application No. 61/594,604, filed on Feb. 3, 2012.

(51) Int. Cl.
*H04W 40/00* (2009.01)
*H04B 7/00* (2006.01)
*H04W 4/22* (2009.01)

(52) U.S. Cl.
CPC ..................................... *H04W 4/22* (2013.01)

(58) Field of Classification Search
CPC ..................... H04M 2242/04; H04M 2242/30; H04W 4/22; H04W 76/007
See application file for complete search history.

(56) References Cited

U.S. PATENT DOCUMENTS

| | | | |
|---|---|---|---|
| 6,819,929 B2 * | 11/2004 | Antonucci et al. | 455/445 |
| 7,991,140 B2 * | 8/2011 | Pines et al. | 379/218.01 |
| 8,462,915 B2 * | 6/2013 | Breen et al. | 379/45 |
| 2006/0293024 A1 * | 12/2006 | Benco et al. | 455/404.2 |
| 2010/0272242 A1 * | 10/2010 | Croy et al. | 379/45 |
| 2013/0007501 A1 * | 1/2013 | Areal et al. | 714/2 |

* cited by examiner

*Primary Examiner* — Jinsong Hu
*Assistant Examiner* — Tabla Glomah

(57) ABSTRACT

A system for dynamically coupling a special number call from a calling unit with at least one function-focused answerer includes: (a) at least one of an unlicensed mobile access network, a radio access network, and a public switched telephone network configured and situated for communicative coupling with the calling unit; (b) at least one network switch coupled with at least one of the networks; and (c) a special number call receiver coupled with the network switch. At least one of the special number call receiver and the network switch is configured for communicative coupling of the special number call with the at least one function-focused answerer unit. After receiving the special number call, the special number call receiver dynamically couples the special number call to an included function-focused answerer. Determining which function-focused answerer is an included function-focused answerer is made at the special number call receiver.

6 Claims, 3 Drawing Sheets

SYSTEM AND METHOD FOR DYNAMICALLY COUPLING A SPECIAL NUMBER CALL WITH A FUNCTION-FOCUSED ANSWERING UNIT

CROSS-REFERENCE TO RELATED APPLICATIONS

This application is a continuation from Provisional U.S. Patent Application Ser. No. 61/594,604, entitled "SYSTEM AND METHOD FOR DYNAMICALLY COUPLING A SPECIAL NUMBER CALL WITH A FUNCTION-FOCUSED ANSWERING UNIT," filed on Feb. 3, 2012, which is incorporated by reference herein in its entirety.

FIELD OF THE INVENTION

The present invention is directed to telecommunication systems, and especially to coupling a special number call with at least one function-focused call recipient during the special number call.

BACKGROUND OF THE INVENTION

Special Number calls may be placed using a variety of mobile communication devices. By way of example and not by way of limitation, special number calls maybe placed using land line telephones using a Plain Old Telephone System (POTS), Internet Protocol (IP) phones, mobile telephones, Personal Digital Assistant (PDA) devices, "Smart" phones, automatic crash notification (ACN) units, mobile radio devices and other communication devices.

A special number call may involve a specialized need that may be best addressed by a function-focused specialized responder. By way of example and not by way of limitation, a special number call reporting a wildfire may be best fielded by a firefighters' command center, an accident related with a traffic jam pursuant to a football game may best be addressed by a university police command center and during a presidential visit all special service calls within a projected movement zone for the President may best be handled by the US Secret Service (USSS). Some responders may maintain function-focused answering units that may be communicatingly coupled to handle a special number call requiring function-focused assistance.

Changing locations, conditions, services sought by the call or other circumstances may require that the routing of the special number call may need to be reevaluated so that coupling with new or additional function-focused entities may need to be effected during the special number call.

Examples of such special number calls are 9-1-1 calls for seeking emergency services and other abbreviated number calls for non-emergency special services, such as "N-1-1" systems. Examples of such N-1-1 systems include "3-1-1" (urgent but not emergency calls) and "5-1-1" (traffic inquiry calls). Special number calls may also include, by way of further example and not by way of limitation, abbreviated numbers for calling commercial services, such as "*820" (calling a radio station) or "GOTIX" (calling for tickets).

For purposes of illustration, by way of example and not by way of limitation, the present invention will be described in the context of an emergency service network in the United States, commonly referred to as a 9-1-1 network. The teachings of the present invention are equally applicable, useful and novel in other special number calling systems, such as maintenance service networks, college campus security networks, abbreviated number networks for calling commercial services and other networks.

A user engaged in a 9-1-1 call seeking emergency services relies on an emergency service call taker or receiver, such as an operator at a Public Safety Answering Point (PSAP; sometimes referred to as a Public Safety Answering Position), to marshal appropriate and sufficient assets to handle an extant emergency situation. Such marshalling is often best carried out by conferring with asset holders, such as first responders (e.g., fire, police and emergency personnel) and the like. Direct communications among an emergency service caller and responding agencies rather than relaying information among participants can be an effective and efficient mode of operation for handling a situation.

Direct involvement by specialized responders may be especially advantageous when a function-focused entity is involved in the call so that their special expertise can be brought to bear early on in the situation giving rise to the call. The PSAP may bridge the call to the function-focused entity, may reroute the call to the function-focused entity, may establish a conference call arrangement whereby the PSAP and the function-focused entity both remain on the line or may otherwise include the function-focused entity in the call.

It may be advantageous to carry out the coupling by, for example, rerouting or bridging at a network switching facility. Network switching facilities may include, by way of example and not by way of limitation, a Mobile Switching Center (MSC) coupled with a radio access network or an unlicensed mobile access network, or an End Office (EO) coupled with a Public Switched Telephone Network (PSTN).

Dynamic routing or bridging or other coupling to a function-focused answering unit is particularly advantageous in that dynamic re-coupling may be carried out in a manner that does not break the connection with the caller and permits re-coupling of the caller with the function-focused answering unit without the caller having to redial the call.

There is a need for a system and method for dynamically coupling a special number call with a function-focused answering unit. For purposes of this description, the term "dynamic coupling" means coupling that may be carried out in a manner that does not break a connection between a caller and a first call recipient and permits re-coupling of the caller with at least one second call recipient without the caller having to redial the call.

SUMMARY OF THE INVENTION

A system for dynamically coupling a special number call from a calling unit with at least one function-focused answering unit includes: (a) at least one of an unlicensed mobile access network, a radio access network, and a public switched telephone network configured and situated for communicative coupling with the calling unit; (b) at least one network switching facility coupled with at least one of the unlicensed mobile access network, the radio access network and the public switched telephone network; and (c) a special number call receiving facility coupled with the at least one network switching facility; at least one of the special number call receiving facility and the at least one network switching facility being configured for effecting communicative coupling of the special number call with the at least one function-focused answering unit. After receiving the special number call, the special number call receiving facility effects dynamically coupling the special number call to one or more included function-focused answering unit of the at least one function-focused answering unit. Determining which function-focused answering unit of the at least one function-focused answering unit is an included function-focused answering unit is made at the special number call receiving facility.

A method for dynamically coupling a special number call from a calling unit with at least one function-focused answering unit includes: (a) receiving the special number call at a special number call receiving facility via a network switching facility; (b) if location information relating to locus of the calling unit is received with the special number call, proceeding to step (d); (c) if no location information relating to locus of the calling unit is received with the special number call, obtaining the location information from a location determining facility coupled with at least one of the network switching facility and the special number call receiving facility; (d) evaluating service required by caller placing the special number call; (e) evaluating location of one or more included function-focused answering unit of the at least one function-focused answering unit; (f) coupling the special number call with one or more included function-focused answering unit of the at least one function-focused answering unit; (g) if treatment necessitated by the special number call is complete, proceed to step (k); (h) if treatment necessitated by the special number call is not complete, in no particular order: (1) determining whether a change in the treatment has occurred; and (2) determining whether a change in the locus has occurred; (i) if a change has occurred in the treatment or in the locus, repeating steps (d) through (h); (j) if no change has occurred in the treatment or in the locus, repeating steps (g) through (h); and (k) terminating the method.

It is, therefore, a feature of the present invention to provide a system and method for dynamically coupling a special number call with a function-focused answering unit.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
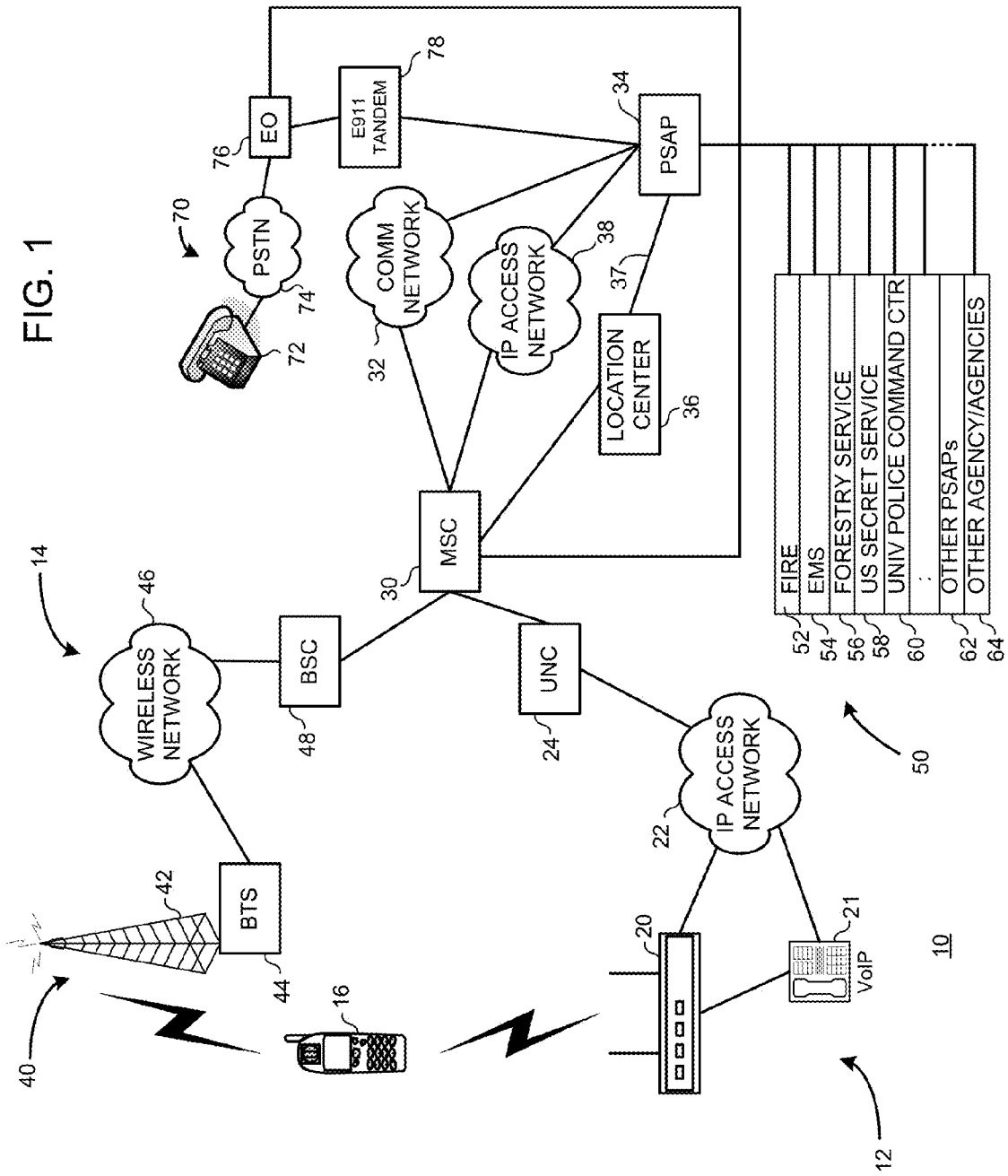
FIG. 1 is a schematic illustration of a system for effecting the present invention.

FIG. 1 is a schematic illustration of a system for effecting the present invention. In FIG. 1, a telecommunication system 10 includes an Unlicensed Mobile Access (UMA) Network (UMAN) 12, a Radio Access Network (RAN) 14 and a Plain Old Telephone System (POTS) network 70.

UMAN 12 may be embodied in, by way of example and not by way of limitation, a Wi-Fi network, a Bluetooth network or another type of UMAN. RAN 14 may be embodied in, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 12 and RAN 14 are configured for wireless communication with a wireless calling unit or instrument 16. Wireless calling unit 16 may be embodied in a wireless calling device including, by way of example and not by way of limitation, mobile telephone, Personal Digital Assistant (PDA) devices, "Smart" phones, automatic crash notification (ACN) units, mobile radio devices and similar communication devices.

UMAN 12 includes an access unit 20 coupled with an Internet Protocol (IP) access network 22. Access unit 20 facilitates communication between wireless communicating unit 16 and IP network 22. IP network 22 is coupled with a UMA Network Controller (UNC) 24. UNC 24 is coupled with a Mobile Switching Center (MSC) 30. MSC 30 is coupled with a communication network 32. Communication network 32 is coupled with a PSAP 34. MSC 30 is also coupled with a location center 36.

As may be understood by those skilled in the art of communication system design, a Voice over Internet Protocol (VoIP) phone could be coupled in any of networks 12, 14, 70 to advantage and could benefit from the present invention. A representative VoIP phone 21 is illustrated in FIG. 1 as coupled within UMAN 12. Specifically, VoIP phone 21 is indicated as being coupled with one or both of access unit 20 and IP network 22.

PSAP 34 may be coupled with MSC 30 via an IP network 38 to permit communication between PSAP 34 and MSC 30 without involving communication network 32. PSAP 34 may be directly coupled with location center 36 via a direct connection 37 to permit communication between PSAP 34 and location center 36 without traversing an intervening network.

RAN 14 includes an access unit 40 that includes a radio antenna embodied in a radio tower 42 and a Base Transceiver Station (BTS) 44 coupled with radio tower 42. BTS 44 is coupled with a private network 46. Private network 46 may be embodied in, by way of example and not by way of limitation, a cellular network or a PCS network employing any of several communication protocols including, by way of further example and not by way of limitation, GSM or another protocol using Time Division Multiple Access (TDMA), Code Division Multiple Access (CDMA) or another coding scheme. Access unit 40 facilitates communication between wireless communicating unit 16 and private network 46. Private network 46 is coupled with a Base Station Controller (BSC) 48. BSC 48 is coupled with MSC 30.

POTS 70 includes a land line telephone unit 72 coupled with a PSTN 74. PSTN 74 is coupled with an End Office (EO) 76 and EOP76 is coupled with an E911 Tandem switch 78. 911 tandem switch 78 is coupled with PSAP 34.

At least one of MSC 30, EO 78 and PSAP 34 is coupled for selectively communicating with various function-focused entities 50 such as, by way of example and not by way of limitation, a fire agency 52, an emergency medical service (EMS) 54, the forestry service 56, the US Secret Service 58, a University Police Command Center 60, other PSAPs 62 and other function-focused entities 64. Any of PSAP 34, MSC 30, E911 tandem 78 and EO 76 may be communicatively coupled with function-focused entities 50 via IP network 38, via communication network 32, via location center 36 or via another network. Such alternate connections and networks are understood by those skilled in the art of telecommunication system design, but are not shown in FIG. 1 in order to avoid cluttering FIG. 1.

Equipment and support for providing dynamic coupling of a call with a function-focused entity 50 may be situated at PSAP 34. Alternatively or additionally, equipment and support for providing dynamic coupling of a call with a function-focused entity 50 may be situated in MSC 30, or EO 78 or both of MSC 30, EO 78. Situating equipment and support in one or both of MSC 30, EO 78 may be a cost effective configuration to avoid the cost of providing equipment and support for providing dynamic coupling of calls with function-focused entities 50 in each of several PSAPs that may be coupled with and supported by MSC 30, EO 78. In any configuration, it is likely that PSAP 34 will be in the best operational position to decide whether to couple (e.g., by bridging or routing) an emergency service call to a function-focused entity 50. This is so because PSAP 34 likely has the first-available information relating to the nature of the situation occasioning the placing of the emergency service call. The nature of the situation occasioning the placing of the emergency service call likely will drive any decision whether to involve a function-focused entity 50 and, if so, which function-focused entity or entities to involve.

Calling unit 16 may wirelessly access UMAN 12 to place an emergency 9-1-1 call via access unit 20 to establish communication with PSAP 34 via IP network 22, UNC 24, MSC 30 and one or both of communication network 32 and IP network 38.

VoIP phone 21 may access UMAN 12 to place an emergency 9-1-1 call via access unit 20 and IP network 22 (or may directly access IP network 22) to establish communication with PSAP 34 via UNC $24_s$ and MSC 30.

Calling unit 16 may instead wirelessly access RAN 14 to place an emergency 9-1-1 call via BTS 44 to establish communication with PSAP 34 via BSC 48, MSC 30 and one or both of communication network 32 and IP network 38.

Telephone unit 72 (telephone unit 72 may also be referred to herein as a calling unit 72) may access PSAP 34 via PSTN 74, EO 76 and E911 tandem 78.

When communication is established between a calling unit 16, 21, 72 and PSAP 34, PSAP 34 may inquire of calling unit 16, 21, 72 or inquire of a user of calling unit 16, 21, 72 regarding the circumstance or circumstances that are the occasion for the call. PSAP 34, or an operator or evaluator manning PSAP 34 can evaluate or triage the situation described by calling unit 16, 21, 72 (e.g., in the case of an ACN unit) or a user of calling unit 16, 21, 72 and may be able to identify the nature of the circumstances.

PSAP 34 or an operator or evaluator manning PSAP 34 can also inquire of the caller as to the locus of the caller, or the location may be ascertained using other means such as, by way of example and not by way of limitation, Global Positioning System (GSM) satellite information accompanying the call signal and cell-and-tower information or other information obtained involving location center 36.

Once the caller's locus or a special nature of an occasion for the call is determined, PSAP 34 or an operator or evaluator manning PSAP 34 may determine that certain of function-focused entities 50 should be involved in the call to aid in coordinating assistance rendered in response to the call. Communications may be established by PSAP 34, by MSC 30, by EO 76 by cooperation between PSAP 34 and MSC 30 or between PSAP 34 and EO 76, or via another arrangement so that appropriate function-focused entities 50 may be included function-focused entities participating in the emergency service call originally placed to PSAP 34. Preferably PSAP 34 may control which function-focused entities 50 remain involved in the emergency service call. PSAP 34 or an operator or evaluator manning PSAP 34 may change participants in the call during the call as necessary such as when assistance requirements, caller locus or other circumstances change. A voice link between calling unit 16, 72 and the first-connected party to the call, such as PSAP 34, may remain a priority connection throughout the duration of the emergency service call.

Figure 2:
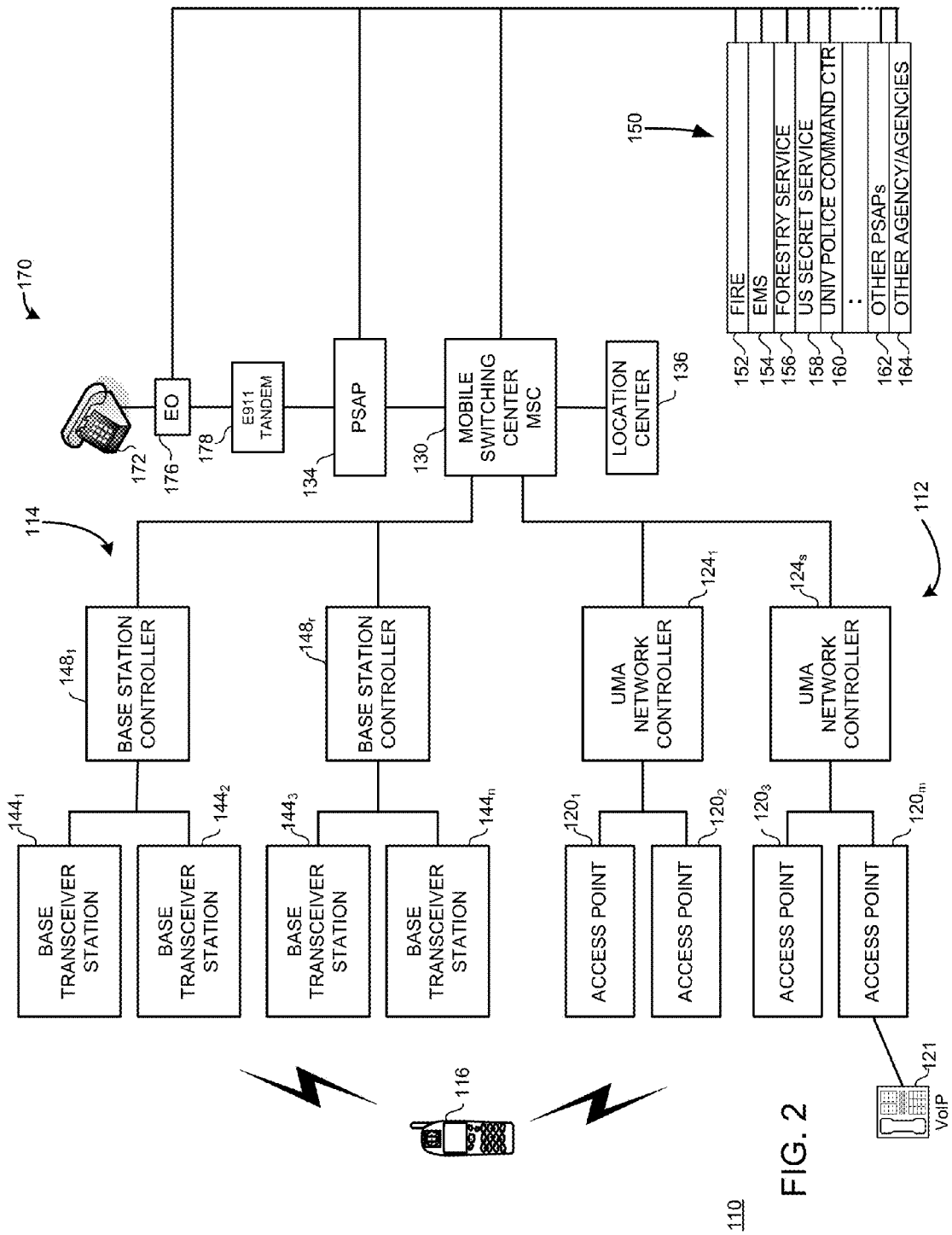
FIG. 2 is a schematic diagram illustrating call routing for a system configured according to the teaching of the present invention deployed in a representative multi-network arrangement.

FIG. 2 is a schematic diagram illustrating call routing for a system configured according to the teaching of the present invention deployed in a representative multi-network arrangement. In FIG. 2, a telecommunication system 110 includes an Unlicensed Mobile Access (UMA) Network (UMAN) 112, a Radio Access Network (RAN) 114 and a Plain Old Telephone System (POTS) network 170.

UMAN 112 may include, by way of example and not by way of limitation, a Wi-Fi network, a Bluetooth network or another type of UMAN. RAN 114 may include, by way of example and not by way of limitation, a cellular network or a Personal Communication System (PCS) network employing any of several communication protocols including, by way of further example and not by way of limitation, GSM or another protocol using Time Division Multiple Access (TDMA), Code Division Multiple Access (CDMA) or another coding scheme. UMAN 112 and RAN 114 are configured for wireless communication with a wireless calling unit or instrument 116.

UMAN 112 includes access units $120_1$, $120_2$, $120_3$, $120_m$ coupled for call routing via an Internet Protocol (IP) network (not shown in FIG. 2; see IP network 22, FIG. 1). The indicator "m" is employed to signify that there can be any number of access units in telecommunication system 110. The inclusion of four access units $120_1$, $120_2$, $120_3$, $120_m$ in FIG. 2 is illustrative only and does not constitute any limitation regarding the number of access units that may be included in a telecommunication system employing the present invention.

Access units $120_1$, $120_2$, $120_3$, $120_m$ facilitate communication with a wireless communicating unit 116. Calls from access units $120_1$, $120_2$ may be placed with a UMA Network Controller (UNC) $124_1$. Calls from access units $120_3$, $120_m$ may be placed with a UMA Network Controller (UNC) $124_s$. The indicator "s" is employed to signify that there can be any number of UNCs in telecommunication system 110. The inclusion of two UNCs $124_1$, $124_s$ in FIG. 2 is illustrative only and does not constitute any limitation regarding the number of UNCs that may be included in a telecommunication system employing the present invention. UNCs $124_1$, $124_s$ are coupled with a Mobile Switching Center (MSC) 130. MSC 130 is coupled for call routing with a receiving or called party such as, by way of example and not by way of limitation, PSAP 134 via a communication network (not shown in FIG. 2; see, e.g., communication network 32 or IP network 38, FIG. 1). MSC 130 is also coupled with a location center 136.

As may be understood by those skilled in the art of communication system design, a Voice over Internet Protocol (VoIP) phone could be coupled in any of networks 112, 114, 170 to advantage and could benefit from the present invention. A representative VoIP phone 121 is illustrated in FIG. 2 as coupled within UMAN 112. Specifically, VoIP phone 121 is indicated as being coupled with access unit $120_m$.

RAN 114 includes access units represented in FIG. 2 by Base Transceiver Stations (BTS) $144_1$, $144_2$, $144_3$, $144_n$. The indicator "n" is employed to signify that there can be any number of BTSs in telecommunication system 110. The inclusion of four BTSs $144_1$, $144_2$, $144_3$, $144_n$ in FIG. 2 is illustrative only and does not constitute any limitation regarding the number of BTSs that may be included in a telecommunication system employing the present invention.

BTSs $144_1$, $144_2$, $144_3$, $144_n$ are coupled for call routing with MCS 130 via a private network (not shown in FIG. 2; see private network 46, FIG. 1). BTSs $144_1$, $144_2$, $144_3$, $144_n$ facilitate communication with wireless communicating unit 116. BTSs $144_1$, $144_2$, $144_3$, $144_n$ are coupled with a Base Station Controllers (BSC) $148_1$, $148_r$. Calls from BTSs $144_1$, $144_2$ may be placed with BSC $148_1$. Calls from BTSs $144_3$, $144_n$ may be placed with a BSC $148_r$. The indicator "r" is employed to signify that there can be any number of BSCs in telecommunication system 110. The inclusion of two BSCs $148_1$, $148_r$ in FIG. 2 is illustrative only and does not constitute any limitation regarding the number of BSCs that may be included in a telecommunication system employing the present invention. BSCs $148_1$, $148_r$ are coupled with MSC 130.

POTS 170 includes a land line telephone unit 172 coupled with PSAP 134 via an End Office (EO) 176 and an E911 Tandem switch 178.

At least one of MSC 130, PSAP 134 and EO 176 may be coupled for selectively communicating with various function-focused entities 150 such as, by way of example and not by way of limitation, a fire agency 152, an emergency medical service (EMS) 154, the forestry service 156, the US Secret Service 158, a University Police Command Center 160, other PSAPs 162 and other function-focused entities 164.

Calling unit 116 may wirelessly access UMAN 112 to place an emergency 9-1-1 call via an access unit $120_1$, $120_2$, $120_3$, $120_m$ to establish communication with PSAP 134 via a UNC $124_1$, $124_s$ and MSC 130.

VoIP phone 121 (VoIP phone 121 may also be referred to herein as a calling unit 121) may access UMAN 112 to place an emergency 9-1-1 call via access unit $120_m$ to establish communication with PSAP 134 via UNC $124_s$ and MSC 130.

Calling unit 116 may instead wirelessly access RAN 114 to place an emergency 9-1-1 call via a BTS $144_1$, $144_2$, $144_3$, $144_n$ to establish communication with PSAP 134 via a BSC $148_1$, $148_r$ and MSC 130.

Telephone unit 172 (telephone unit 172 may also be referred to herein as a calling unit 172) may access PSAP 134 via EO 176 and E911 tandem 178.

When communication is established between a calling unit 116, 121, 172 and PSAP 134, PSAP 134 may inquire of calling unit 116, 121, 172 or inquire of a user of calling unit 116, 121, 172 regarding the circumstance or circumstances that are the occasion for the call. PSAP 134, or an operator or evaluator manning PSAP 134 can evaluate or triage the situation described by calling instrument 116, 121, 172 (e.g., in the case of an ACN unit) or a user of calling unit 116, 121, 172 and may be able to identify the nature of the circumstances.

PSAP 134, or an operator or evaluator manning PSAP 134 can also inquire of the caller as to the locus of the caller, or the location may be ascertained using other means such as, by way of example and not by way of limitation, Global Positioning System (GSM) satellite information accompanying the call signal and cell-and-tower information or other information obtained involving location center 136.

Once the caller's locus is determined, PSAP 134 or an operator or evaluator manning PSAP 134 may determine that certain of function-focused entities 150 should be involved in the call to aid in coordinating assistance rendered in response to the call. Communications may be established by PSAP 134, by MSC 130, by cooperation between PSAP 134 and MSC 130 or via another arrangement so that appropriate function-focused entities 150 may be included via function-focused answering units associated with function-focused entities participating in the emergency service call originally placed to PSAP 134. Preferably PSAP 134 may control which function-focused entities 150 remain involved in the emergency service call. PSAP 134 or an operator or evaluator manning PSAP 134 may change participants in the call during the call as assistance requirements, caller locus or other circumstances change. Preferably, a voice link between mobile unit 116 and the first-connected party to the call, such as PSAP 134, remains a priority connection throughout the duration of the emergency service call.

Figure 3:
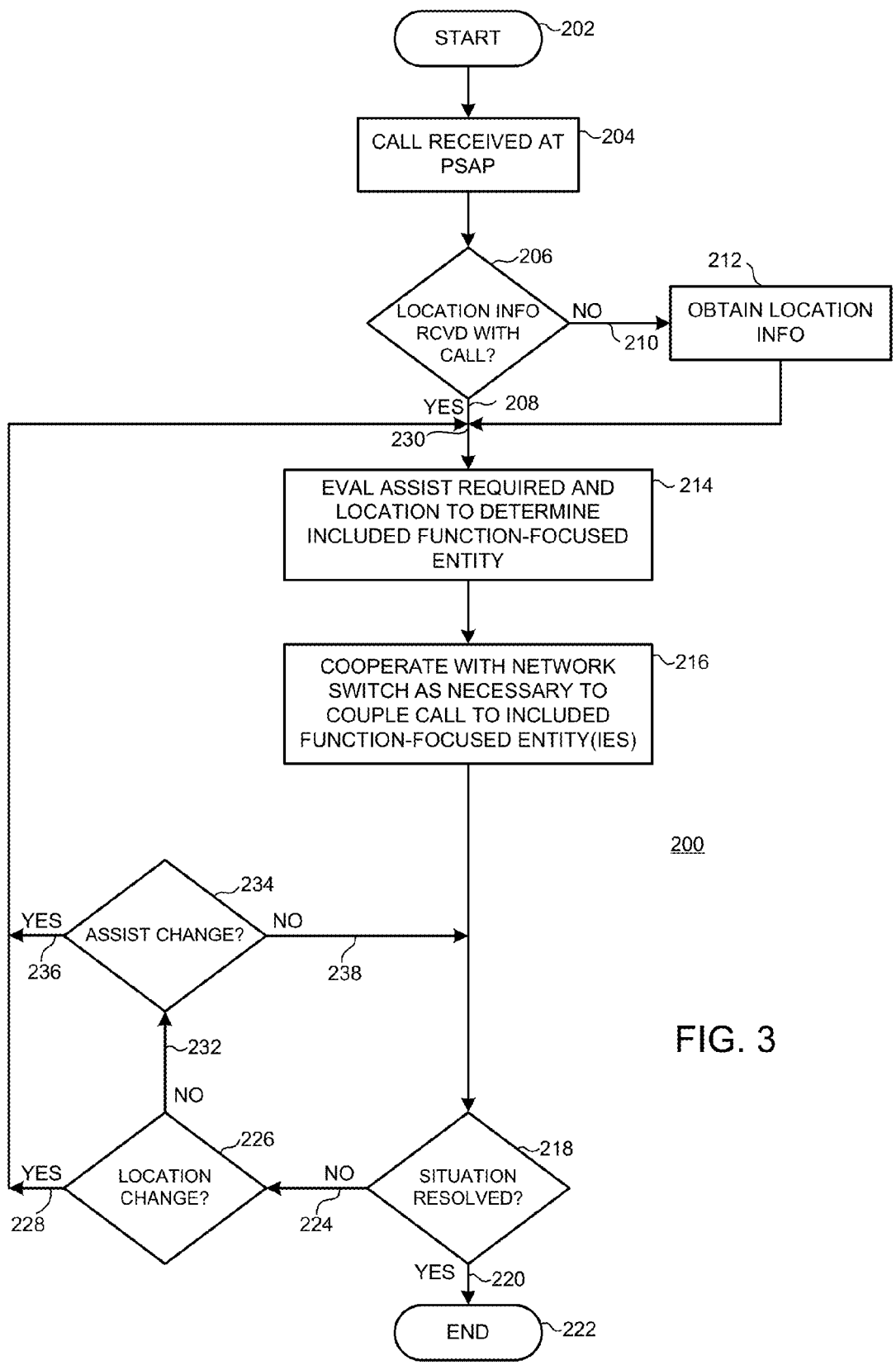
FIG. 3 is a flow diagram illustrating the method of the present invention.

FIG. 3 is a flow diagram illustrating the method of the present invention. In FIG. 3, a method 200 for substantially simultaneously routing a special number call from a calling unit to at least one function-focused answering unit associated with a function-focused entity begins at a START locus 202.

Method 200 continues with receiving the special number call at a special number call receiving facility via a network switching facility, as indicated by a block 204.

Method 200 continues with posing a query whether location information relating to locus of the calling unit is received with the special number call, as indicated by a query block 206. If location information relating to locus of the calling unit is received with the special number call, method 200 proceeds from query block 206 via a YES response line 208 to evaluate service required by the caller placing the special number call, including determining which function-focused answering units may be available to assist and, based upon agency capabilities and location, and which function-focused answering units should be included in the special number call, as indicated by a block 214.

If no location information relating to locus of the calling unit is received with the special number call, method 200 proceeds from query block 206 via a NO response line 210 to obtain location information relating to locus of the calling unit from a location determining facility coupled with at least one of the network switching facility and the special number call receiving facility, as indicated by a block 212. Method 200 thereafter proceeds from block 212 to evaluate service required by the caller placing the special number call, including determining which function-focused answering units may be available to assist and, based upon function-focused answering units capabilities and location, and which function-focused answering units should be included in the special number call, as indicated by a block 214.

Method 200 continues with routing the special number call to one or more included function-focused answering units of the at least one function-focused answering unit, as indicated by a block 216.

Method 200 continues with posing a query whether the situation occasioning the special number call has been resolved, as indicated by a query block 218. If the situation occasioning the special number call has been resolved, method 200 proceeds from query block 218 via a YES response line 220 and method 200 terminates, as indicated by an END locus 222.

If the situation occasioning the special number call has not been resolved, method 200 proceeds from query block 218 via a NO response line 224 and, in no particular order, poses queries indicated by query blocks 226, 234. Only for purposes of illustration of method 200, query block 226 first poses a query whether the locus of the calling unit has changed. If the locus of the calling unit has changed, method 200 proceeds from query block 226 via a YES response line 228 to a juncture 230, and method 200 thereafter repeats steps indicated by blocks 214, 216, 218, 226.

If the locus of the calling unit has not changed, method 200 proceeds from query block 226 via a NO response line 232 and method 200 poses a query whether assistance required by the caller placing the special number call has changed, as indicated by a query block 234. If assistance required by the caller placing the special number call has changed, method 200 proceeds from query block 234 via a YES response line 236 to juncture 230, and method 200 thereafter repeats steps indicated by blocks 214, 216, 218, 226, 234.

If assistance required by the caller placing the special number call has not changed, method 200 proceeds from query block 234 via a NO response line 238 and method 200 thereafter repeats the step indicated by block 218.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims.

The invention claimed is:

1. A method for dynamically coupling a special number call from a calling unit with at least one function-focused answering unit; the method comprising:
   (a) receiving said special number call at a special number call receiving facility via a network switching facility;
   (b) if location information relating to locus of said calling unit is received with said special number call, proceeding to step (d);
   (c) if no location information relating to locus of said calling unit is received with said special number call, obtaining said location information from a location determining facility coupled with at least one of said network switching facility and said special number call receiving facility;
   (d) evaluating service required by caller placing said special number call;
   (e) determining which function-focused answering units are to be included in the special number call based upon function-focused answering unit capabilities and location;
   (f) coupling said special number call with one or more included function-focused answering units of said at least one function-focused answering unit;
   (g) if treatment necessitated by said special number call is complete, proceed to step (k);
   (h) if treatment necessitated by said special number call is not complete, in no particular order:
      (1) determining whether a change in said treatment has occurred; and
      (2) determining whether a change in said locus has occurred;
   (i) if a change has occurred in said treatment or in said locus, repeating steps (d) through (h);
   (j) if no change has occurred in said treatment or in said locus, repeating steps (g) through (h); and
   (k) terminating the method.

2. The method for dynamically coupling a special number call from a calling unit with at least one function-focused answering unit as recited in claim 1 wherein said network switching facility is one of a mobile switching center coupled with at least one of said unlicensed mobile access network and said radio access network, or an end office coupled with said public switched telephone network.

3. The method for dynamically coupling a special number call from a calling unit with at least one function-focused answering unit as recited in claim 1 wherein communication between said special number call receiving facility and a respective included function-focused answering unit may be established as at least one of voice communication and data communication.

4. The method for dynamically coupling a special number call from a calling unit with at least one function-focused answering unit as recited in claim 1 wherein which function-focused answering unit of said at least one function-focused answering unit is an included function-focused answering unit may be changed by said special number call receiving facility during said special number call.

5. The method for dynamically coupling a special number call from a calling unit with at least one function-focused answering unit as recited in claim 2 wherein communication between said special number call receiving facility and a respective included function-focused answering unit may be established as at least one of voice communication and data communication.

6. The method for dynamically coupling a special number call from a calling unit with at least one function-focused answering unit as recited in claim 5 wherein which function-focused answering unit of said at least one function-focused answering unit is an included function-focused answering unit may be changed by said special number call receiving facility during said special number call.

\* \* \* \* \*